United States Patent
Smith et al.

(10) Patent No.: US 8,417,117 B2
(45) Date of Patent: Apr. 9, 2013

(54) DWDM AND CWDM HYBRID PON SYSTEM AND METHOD

(75) Inventors: Joseph Lee Smith, Ruquay Varina, NC (US); Alain Granger, Raleigh, NC (US); David Eckard, Knightdale, NC (US); Jihad Baghdadi, Raleigh, NC (US)

(73) Assignee: Alcatel Lucent, Paris (FR)

( * ) Notice: Subject to any disclaimer, the term of this patent is extended or adjusted under 35 U.S.C. 154(b) by 1212 days.

(21) Appl. No.: 11/870,231

(22) Filed: Oct. 10, 2007

(65) Prior Publication Data

US 2008/0089684 A1 Apr. 17, 2008

Related U.S. Application Data

(60) Provisional application No. 60/828,975, filed on Oct. 10, 2006, provisional application No. 60/886,553, filed on Jan. 25, 2007.

(51) Int. Cl.
*H04J 14/00* (2006.01)
*H04J 14/02* (2006.01)

(52) U.S. Cl.
USPC ............ 398/58; 398/70; 398/71; 398/72; 398/66; 398/67; 398/68

(58) Field of Classification Search ............ 398/85, 398/82, 79
See application file for complete search history.

(56) References Cited

U.S. PATENT DOCUMENTS

| | | | | |
|---|---|---|---|---|
| 6,151,336 A * | 11/2000 | Cheng et al. | .................. | 370/535 |
| 2002/0102057 A1* | 8/2002 | Yue | .................. | 385/43 |
| 2004/0141685 A1* | 7/2004 | Zhou et al. | .................. | 385/24 |
| 2005/0025488 A1* | 2/2005 | Wang et al. | .................. | 398/83 |
| 2006/0153565 A1* | 7/2006 | Park et al. | .................. | 398/71 |
| 2007/0092255 A1* | 4/2007 | Bouda | .................. | 398/72 |
| 2007/0212072 A1* | 9/2007 | Iannone et al. | .................. | 398/72 |
| 2007/0297801 A1* | 12/2007 | Mostert et al. | .................. | 398/81 |

* cited by examiner

*Primary Examiner* — Shi K Li
*Assistant Examiner* — Oommen Jacob
(74) *Attorney, Agent, or Firm* — RG IP, LLC

(57) ABSTRACT

A passive optical network (PON) comprises an Optical Line Termination (OLT), an Optical Distribution Network (ODN), and a plurality of Optical Network Terminations (ONTs), wherein the OLT includes an OLT Dense Wavelength Division Multiplexing (DWDM) multiplexer, an OLT CWDM demultiplexer, and a Wavelength Division Multiplexing (WDM) filter, wherein the OLT DWDM multiplexer and the OLT CWDM demultiplexer are coupled to the WDM filter, wherein the ODN includes a WDM filter, a DWDM demultiplexer, and a plurality of fanout splitters, wherein the DWDM demultiplexer is coupled to the WDM filter, wherein the WDM filters are coupled to one another and wherein a portion of the plurality of ONTs that are associated with a wavelength are coupled to one of fanout splitters that is associated with the wavelength.

19 Claims, 6 Drawing Sheets

DWDM AND CWDM HYBRID PON SYSTEM AND METHOD

CROSS-REFERENCE TO RELATED APPLICATIONS

The present disclosure is related to and claims priority from U.S. provisional patent application No. 60/828,975 entitled DWDM PON Hybrid Approach, Combiner/Splitter, and Low Loss Optical Combiner Scheme for DWDM PON with TDMA Upstream Path filed on Oct. 10, 2006, and from U.S. provisional patent application No. 60/886,553, entitled DWDM+CWDM PON Hybrid Approach, filed on Jan. 25, 2007, the entire contents of each of which are incorporated by reference herein.

FIELD OF THE INVENTION

The present disclosure is generally related to Passive Optical Networks (PONs), and more particularly to Dense Wavelength Division Multiplexing (DWDM) and Coarse Wavelength Division Multiplexing (CWDM) Hybrid PON systems and methods.

BACKGROUND OF THE INVENTION

A passive optical network (PON) is a system that brings optical fiber cabling and signals all or most of the way to an end user. The term "passive" simply describes the fact that optical transmission has no power requirements or active electronic parts once the signal is going through the network. A traditional PON consists of an Optical Line Termination (OLT) at a communication company's office, for example, and a number of Optical Network Units (ONUs) near end user equipment. An ONU is a form of Access Node that converts optical signals transmitted via fiber to electrical signals that can be transmitted via coaxial cable or twisted pair copper wiring to end user equipment.

Access PONs are continuing to evolve to provide more bandwidth to the end user. However, the predominant mode of evolution results in the replacement or new installation of new Optical Network Termination (ONTs) at higher bandwidths or point-to-point optical links. This means service providers are in a constant state of equipment replacement, or have stranded investments that have to be continually leveraged before they can consider replacement for enhanced bandwidth and services.

All known scenarios at this time result ultimately in ONTs having to be replaced to obtain higher bandwidth capabilities, primarily limited by the fact of downstream available bandwidth that must be shared by multiple end terminals (i.e. ONTs). For example, current Next Generation Access (NGA) PON proposals include 10G PON and WDM PON. 10G PON is focusing on 10G ONTs and 1G ONTs being able to share the same PON, but in order to get 10G capability a new ONT is required. Likewise, WDM PONs that have been proposed basically focus on providing unique wavelengths to each ONT. As stated, each of the known solutions requires a change to some, or all, of the ONTs on the PON in order to increase the PON's bandwidth. This is required even if only downstream bandwidth increases are needed (the predominant case).

Therefore, what is needed is a system and method that overcomes the problems and limitations disclosed above.

SUMMARY OF THE INVENTION

The present disclosure provides Dense Wavelength Division Multiplexing (DWDM) and Coarse Wavelength Division Multiplexing (CWDM) Hybrid PON systems and methods that improve existing bandwidth capabilities without requiring a complete change-out of all existing OLT and ONT equipment.

In one embodiment of the present disclosure, a passive optical network (PON) comprises an Optical Line Termination (OLT), an Optical Distribution Network (ODN), and a plurality of Optical Network Terminations (ONTs), wherein the OLT includes an OLT Dense Wavelength Division Multiplexing (DWDM) multiplexer, an OLT CWDM demultiplexer, and a Wavelength Division Multiplexing (WDM) filter, wherein the OLT DWDM multiplexer and the OLT CWDM demultiplexer are coupled to the WDM filter, wherein the ODN includes a WDM filter, a DWDM demultiplexer, and a plurality of fanout splitters, wherein the DWDM demultiplexer is coupled to the WDM filter, wherein the WDM filters are coupled to one another and wherein a portion of the plurality of ONTs that are associated with a wavelength are coupled to one of fanout splitters that is associated with the wavelength.

In another embodiment of the present disclosure, a gigabit passive optical network (GPON) is provided. The GPON comprises an upstream and downstream combiner, a DWDM filter coupled to the upstream and downstream combiner, a plurality of splitters, and a plurality of optical network terminations (ONTs), wherein a portion of the plurality of ONTs associated with a wavelength are coupled to one of the plurality of splitters associated with the wavelength.

In a further embodiment of the present disclosure, a method for increasing bandwidth of a passive optical network is provided. A downstream wavelength band comprising a plurality of optical channels is routed to and received at a Wavelength Division Multiplexing (WDM) filter. The downstream wavelength band is separated into the plurality of optical channels using the DWDM demultiplexer. One of the plurality of optical channels is routed to one of a plurality of splitters. The one of the plurality of optical channels is routed to a portion of a plurality of optical network terminations (ONTs).

DETAILED DESCRIPTION OF THE INVENTION

Figure 1:
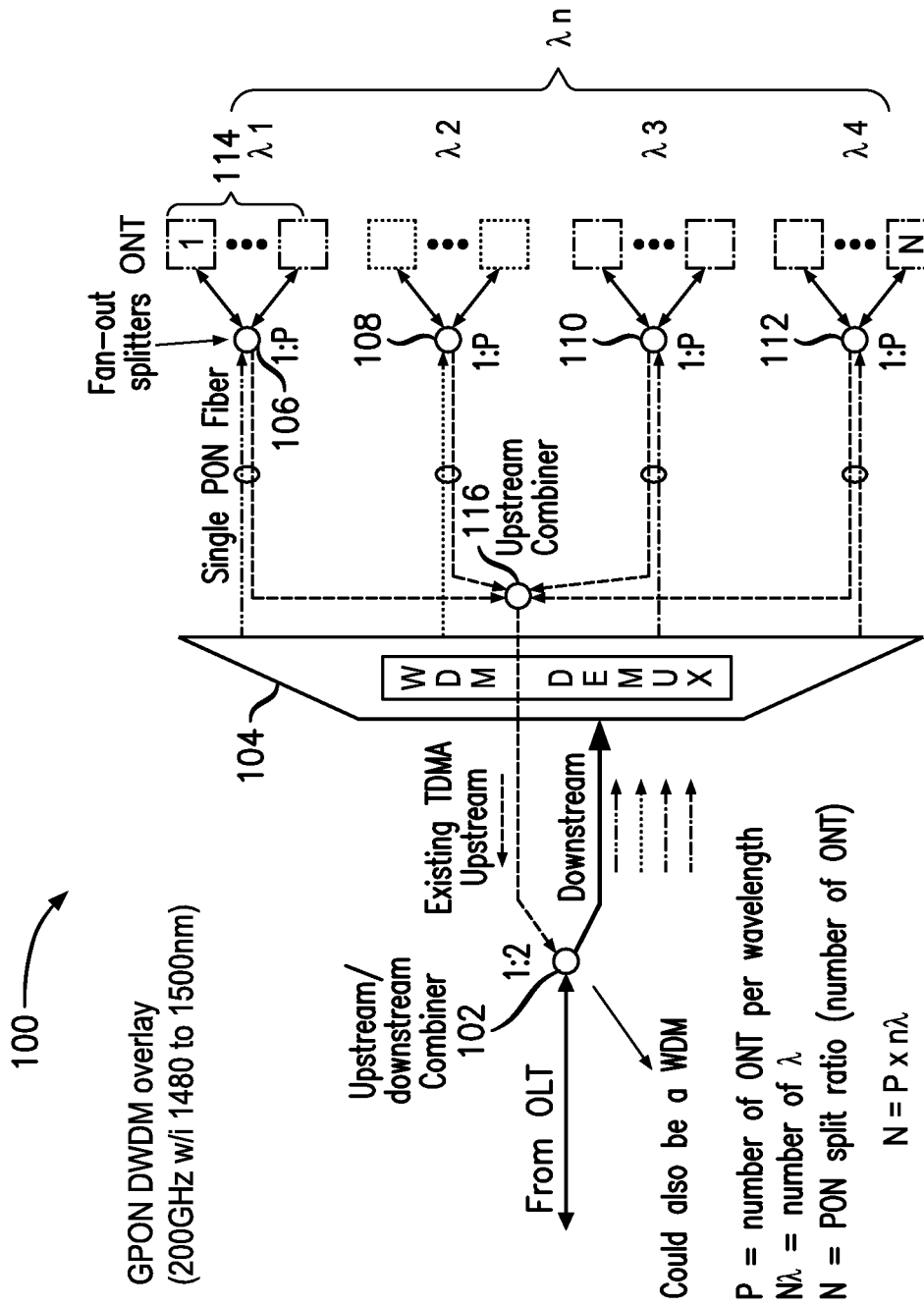
FIG. 1 depicts a downstream DWDM based architecture of a hybrid PON system in accordance with one embodiment of the present disclosure.

Referring now to FIG. 1, a downstream DWDM based architecture of a hybrid PON system 100 includes an upstream and downstream combiner 102 that receives a downstream wavelength from an optical line terminal (OLT).

The downstream wavelength may be a nominal 1480-1500 nm wavelength band. The downstream wavelength is then fed into a Dense Wavelength Division Multiplexing (DWDM) filter 104 to separate the downstream wavelength into a plurality of optical channels. The DWDM filter 104 may be a four or more channel DWDM filter. With the nominal 1480-1500 nm wavelength, 4 DWDM optical channels are used as examples.

The DWDM filter 104 is coupled to a plurality of fanout splitters, for example, fanout splitters 106, 108, 110, and 112. The DWDM filter 104 routes one of the plurality of optical channels to a fanout splitter, for example, fanout splitter 106. The fanout splitter 106 routes the one of the plurality of optical channels to a portion of a plurality of optical network terminations (ONTs). In this example, the DWDM filter 104 routes each of the four DWDM optical channels to a portion of the total ONTs, yielding each of eight ONTs an optical channel, as illustrated by portion 114. Thus, the number of ONTs on the hybrid PON 100 is divided by the number of DWDM channels being utilized. Continuing with the above example, each of the eight ONTs in portion 114 receives the same DWDM optical channel. Since each ONT only has to share with seven other ONTs instead of 31 other ONTs, the available bandwidth to each ONT is increased by the factor of the reduction of optical channels, in this case, four times. Since the DWDM optical channel is constrained within the 1480-1500 nm wavelength band as defined by the PON standard, no changes to the plurality of ONTs is required.

In addition to the enhancement in the downstream approach, the upstream path may also be upgraded. Since the plurality of ONTs transmit a plurality of time division multiple access (TDMA) optical channels upstream, the hybrid PON system 100 includes an upstream combiner 116 that combines the plurality of TDMA optical channels from the plurality of ONTs. In order to receive the optical channel from each of the ONTs, the upstream combiner 116 comprises an input port for each of the plurality of optical channels. In this example, upstream combiner 116 comprises four input ports, one for each of the DWDM optical channels. The upstream combiner 116 then routes the TDMA optical channels to the upstream and downstream combiner 102 in order to place the channels on a single fiber back to the optical line terminal (OLT). Since the ONTs transmit at 1310 nm using the TDMA approach already defined by standards, no change to the ONTs is required.

With this approach, existing deployed ONTs may remain in service while significantly increasing the ONT's effective downstream bandwidth. In one example, the downstream bandwidth of the ONTs is increased by four times since there are four times fewer ONTs per optical channel and reallocation of existing bandwidth is possible among the fewer ONTs. This architecture also allows for reduction of downstream path loss, and increase of effective splits per PON, while maintaining the existing bandwidth per ONT. Due to the use of wavelength splitters instead of traditional optical power splitters, path losses are lower and link distance could be increased.

Figure 2:
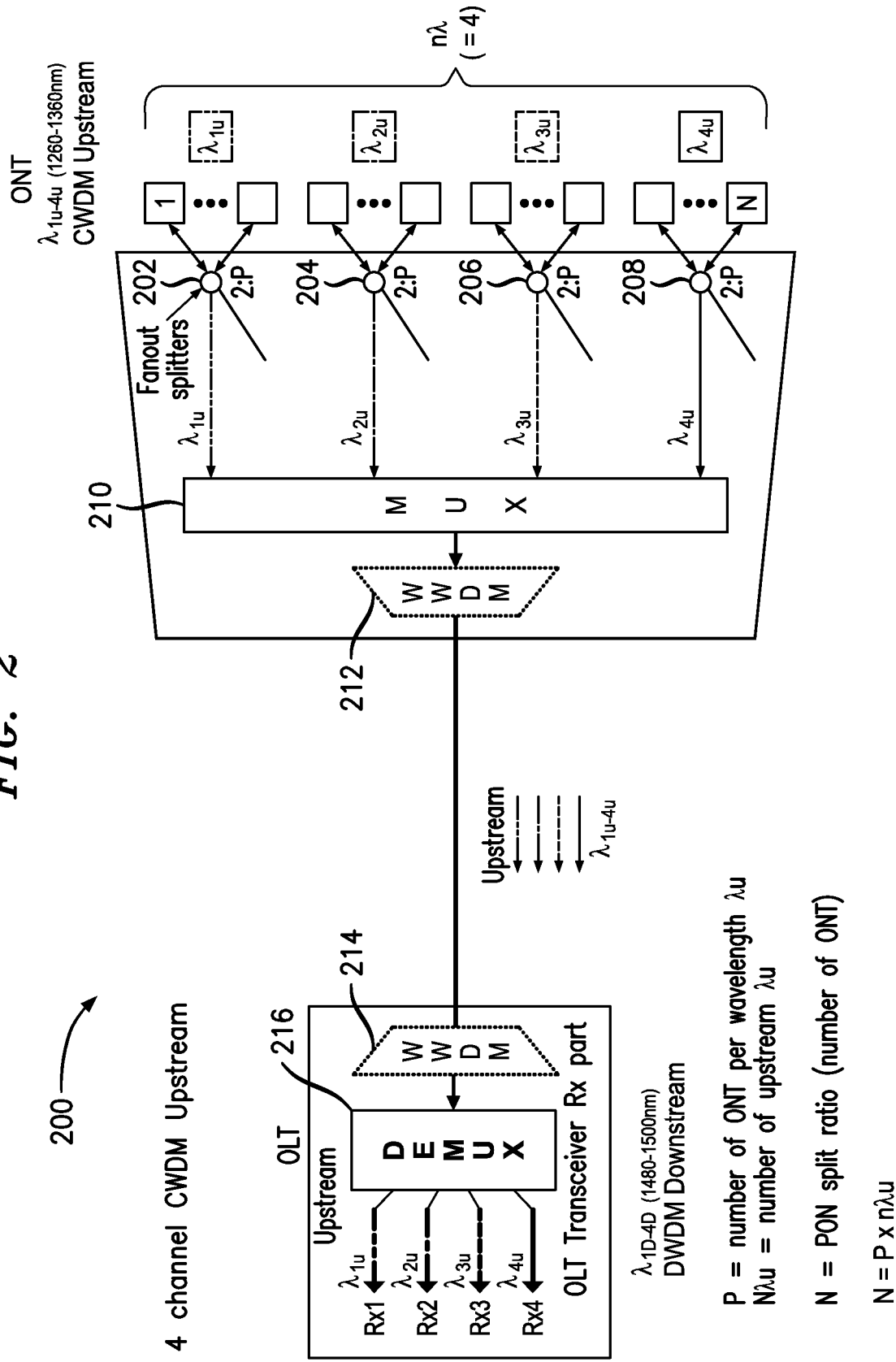
FIG. 2 depicts an upstream CWDM architecture of a hybrid PON system in accordance with one embodiment of the present disclosure.

In addition to upgrading the downstream bandwidth, the upstream bandwidth may also be overbuilt. Referring to FIG. 2, an upstream Coarse Wavelength Division Multiplexing (CWDM) architecture of a hybrid PON system 200 includes a plurality of fanout splitters 202, 204, 206, and 208. Each of the fanout splitters 202, 204, 206, and 208 receives a plurality of CWDM optical channels from a portion of a plurality of ONTs. In this example, the plurality of CWDM optical channels may be two to four CWDM optical channels and the upstream wavelength may be a 1260 to 1360 nm wavelength band.

Each of the plurality of fanout splitters, such as fanout splitter 202, routes one of the plurality of CWDM optical channels to a CWDM multiplexer 210. The CWDM multiplexer 210 combines the plurality of optical channels and then routes the upstream wavelength band to a WDM filter 212. The WDM filter 212 routes the upstream wavelength band to WDM filter 214. The WDM filter 214 routes the upstream wavelength band comprising the plurality of optical channels to the OLT CWDM demultiplexer 216. The OLT demultiplexer 216 routes each of the plurality of optical channels to an associated optical receiver at the OLT. By employing the CWDM approach, each ONT is assigned a CWDM band to operate within and the bands are equally distributed among all possible ONTs within the PON.

With this approach, the CWDM techniques are combined within the nominal 1310 nm upstream wavelength band to increase the bandwidth by up to four times the existing bandwidth. While this approach may require new ONTs to be deployed, the ONT RX circuitry may not need to change and the cost of ONT TX laser supporting CWDM may not be higher than existing single wavelength lasers.

Figure 3:
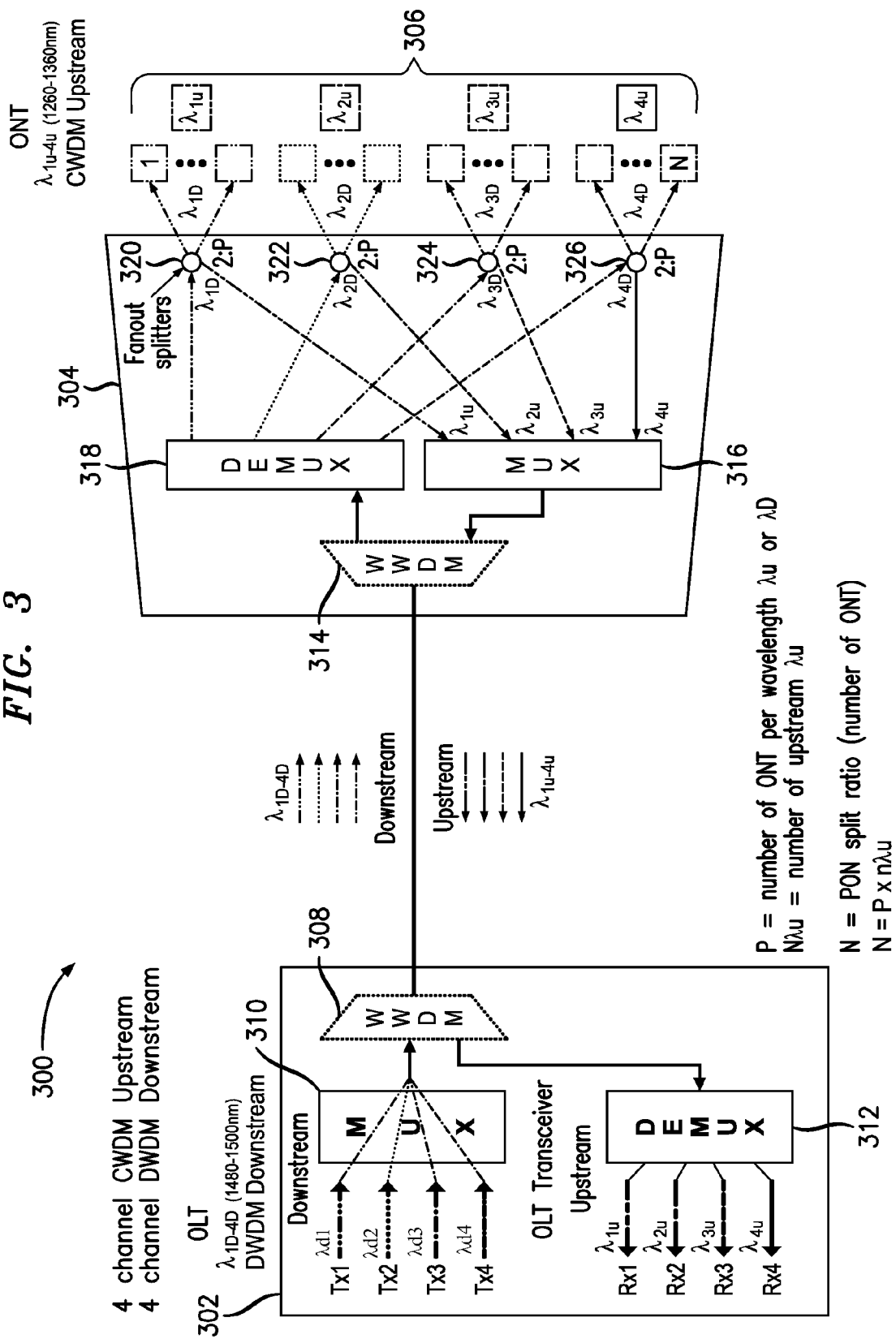
FIG. 3 depicts an integrated upstream and downstream architecture of a hybrid PON system in accordance with one embodiment of the present disclosure.

Referring to FIG. 3, an integrated upstream and downstream architecture of a hybrid PON system 300 includes an Optical Line Termination (OLT) 302, an Optical Distribution Network (ODN) 304, and a plurality of Optical Network Terminations (ONTs) 306. The OLT 302 includes a Wavelength Division Multiplexing (WDM) filter 308, a DWDM multiplexer 310, and a CWDM demultiplexer 312. The multiplexer 310 and the demultiplexer 312 are coupled to the WDM filter 308.

The ODN 304 includes a Wavelength Division Multiplexing (WDM) filter 314, a CWDM multiplexer 316, a DWDM demultiplexer 318, and a plurality of fanout splitters, such as fanout splitters 320, 322, 324, and 326. The CWDM multiplexer 316 and the DWDM demultiplexer 318 are coupled to the WDM filter 314. The WDM filter 314 is also coupled to the WDM filter 308. A portion of ONTs 306 is associated with a wavelength and that portion of ONTs is coupled to one of the plurality of fanout splitters that is associated with the wavelength. For example, a group of eight ONTs may be associated with a wavelength $\lambda_{1u}$ and is coupled to fanout splitter 320.

The WDM filter 314 receives a downstream wavelength band, for example, a 1480 nm-1500 nm band, comprising a plurality of optical channels. The WDM filter 314 then routes the plurality of optical channels to the DWDM demultiplexer 318. The DWDM demultiplexer 318 separates the downstream wavelength band into a plurality of optical channels, for example, four DWDM channels, and routes one of the plurality of optical channels of the wavelength to a fanout splitter, such as fanout splitter 320. Fanout splitter 320 then routes the optical channel to a portion of ONTs. Continuing with the above example, each of the eight ONTs receives the same DWDM optical channel from fanout splitter 320. Therefore, instead of 31 other ONTs, each ONT only has to share the bandwidth with seven other ONTs utilizing the same optical channel. In this way, the available bandwidth per ONT is increased by a factor equivalent to the reduction of optical channels, in this case, a factor of four.

To send upstream, the portion of ONTs routes an upstream wavelength band comprising a plurality of optical channels to a fanout splitter, such as fanout splitter 320. One example of the upstream wavelength band is a CWDM optical channel within the 1260 nm-1360 nm wavelength band. The fanout splitter 320 then routes the optical channel of the upstream wavelength to the CWDM multiplexer 316. The CWDM multiplexer 316 combines the plurality of optical channels and routes the upstream wavelength band to the WDM filter 314. When the WDM filter 308 receives the upstream wavelength from the WDM filter 314, the CWDM filter routes the upstream wavelength band to the OLT CWDM demultiplexer 312. The OLT CWDM demultiplexer 312 separates the upstream wavelength band into a plurality of optical channels and routes each of the optical channels to an associated optical receiver at the OLT 302.

Figure 4:
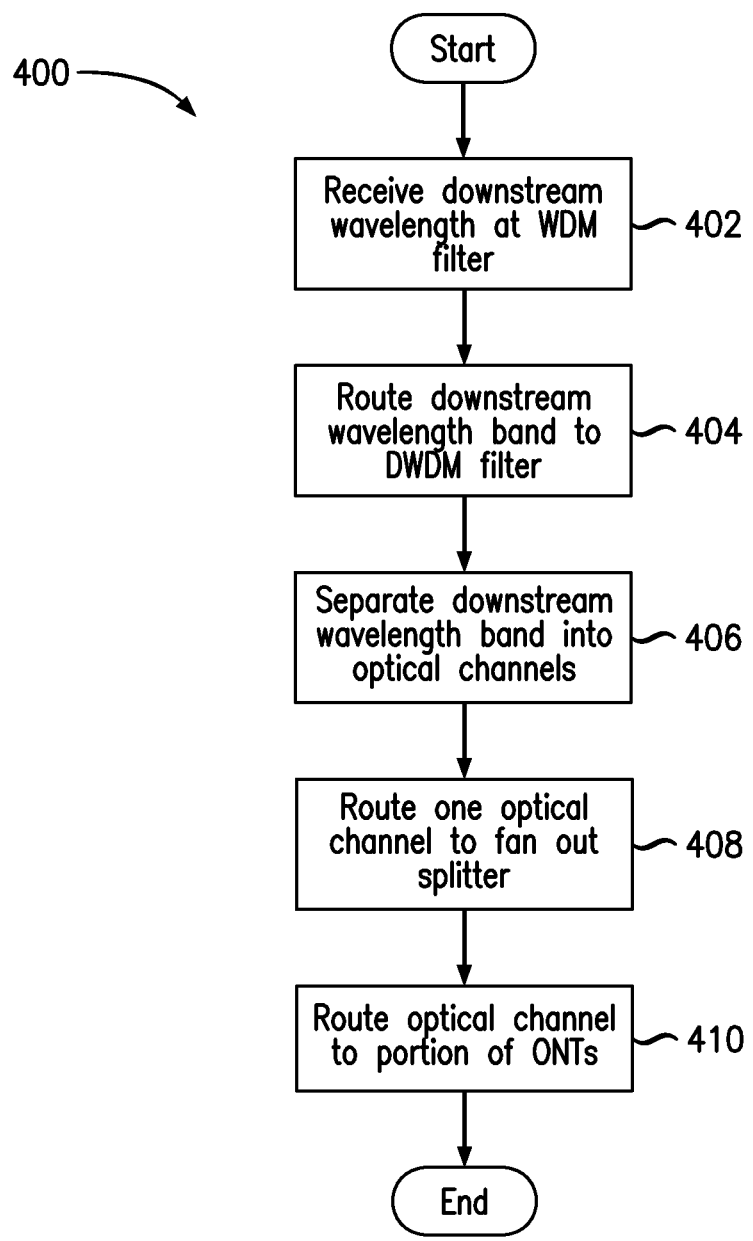
FIG. 4 depicts a flow diagram describing a method for a downstream architecture of a hybrid PON system in accordance with one embodiment of the present disclosure.

Referring to FIG. 4, a flow diagram describing a method for a downstream architecture of a hybrid PON system is depicted in accordance with one embodiment of the present disclosure. Process 400 begins at step 402 with receiving a downstream wavelength band comprising a plurality of optical channels at a Wavelength Division Multiplexing (WDM) filter. Process 400 then continues to step 404 to route the downstream wavelength band to a Dense wavelength division multiplexing (DWDM) filter. Next, process 400 continues to step 406 to separate the downstream wavelength band into the plurality of optical channels using a DWDM demultiplexer. Process 400 then continues to step 408 to route one of the plurality of optical channels to one of a plurality of splitters. Process 400 then completes at step 410 to route the one of the plurality of optical channels to a portion of a plurality of optical network terminations (ONTs).

Figure 5:
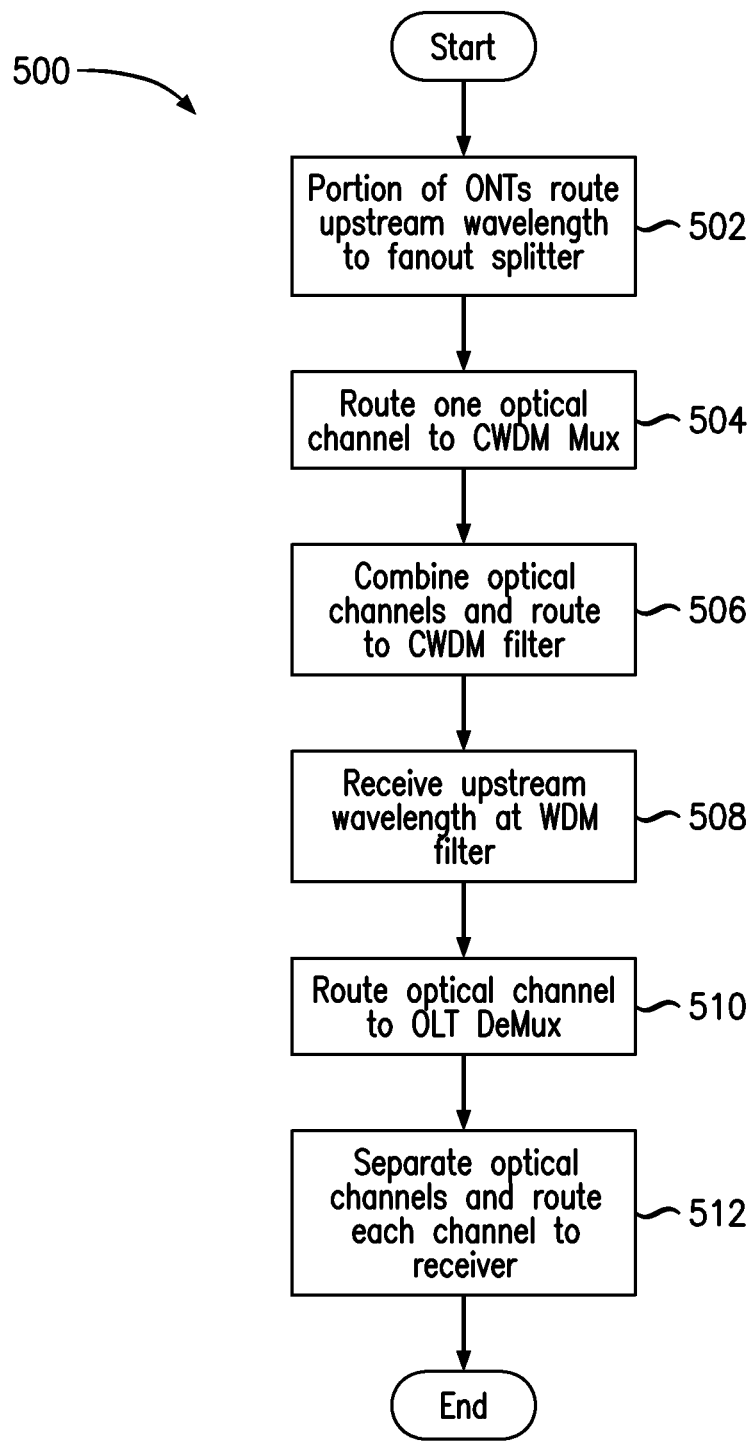
FIG. 5 depicts a flow diagram describing a method for an upstream architecture of a hybrid PON system in accordance with one embodiment of the present disclosure.

Referring to FIG. 5, a flow diagram describing a method for an upstream architecture of a hybrid PON system is depicted in accordance with one embodiment of the present disclosure. Process 500 begins at step 502 with the portion of the plurality of ONTs routing an upstream wavelength band comprising a plurality of optical channels to one of the plurality of fanout splitters. Process 500 then continues to step 504 to route one of the optical channels of the upstream wavelength to the CWDM multiplexer. Process 500 then continues to step 506 to combine the optical channels and route the plurality of optical channels of the upstream wavelength to the WDM filter. Process 500 then continues to step 508 to receive the upstream wavelength comprising a plurality of optical channels at the WDM filter. Process 500 then continues to step 510 to route the plurality of optical channels to the OLT CWDM demultiplexer. The process 500 then completes at step 512 to separate the plurality of optical channels and route each optical channel to an associated optical receiver at the OLT.

Figure 6:
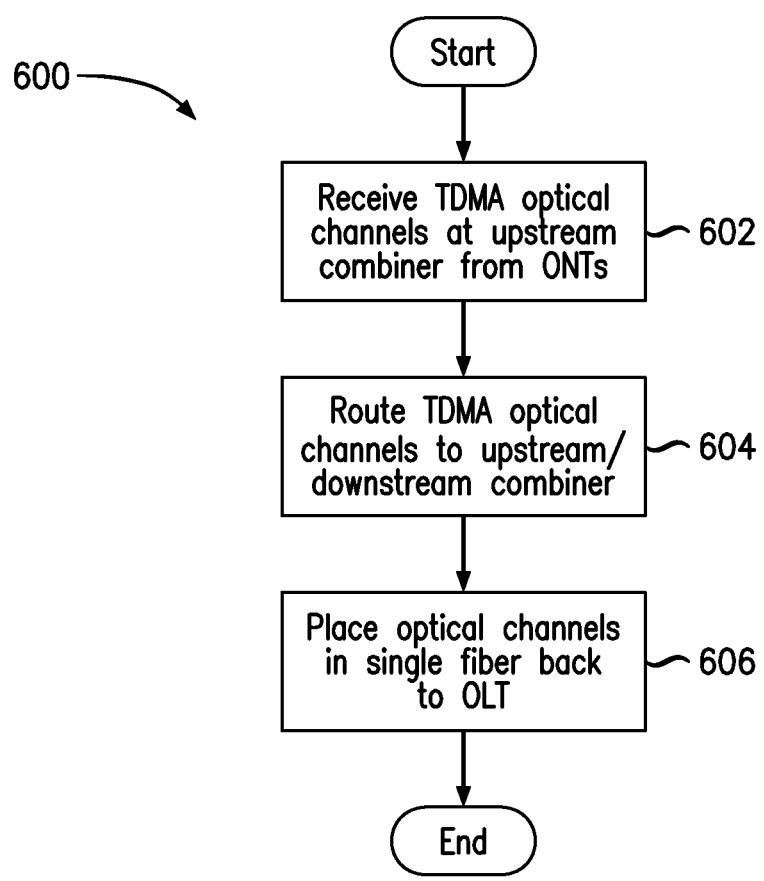
FIG. 6 depicts a flow diagram describing a method for an upstream architecture of a hybrid PON system in accordance with an alternative embodiment of the present disclosure.

Referring to FIG. 6, a flow diagram describing a method for an upstream architecture of a hybrid PON system is depicted in accordance with an alternative embodiment of the present disclosure. Process 600 begins at step 602 with receiving TDMA optical channels at the upstream combiner from the ONTs. Process 600 then continues to step 604 to route the TDMA optical channels to an upstream and downstream combiner. Process 600 then completes at step 606 to place the optical channels in a single fiber back to the OLT.

In summary, the present disclosure provides an upstream and downstream architecture of a hybrid PON system that increases effective available bandwidth to existing ONTs without having to make changes to ONTs themselves. Alternatively, the present disclosure also provides an upstream architecture that may require some changes in the ONTs themselves to provide upstream bandwidth enhancements.

Although an exemplary embodiment of the system and method of the present disclosure has been illustrated in the accompanied drawings and described in the foregoing detailed description, it will be understood that the disclosure is not limited to the embodiments disclosed, but is capable of numerous rearrangements, modifications, and substitutions without departing from the spirit of the disclosure as set forth and defined by the following claims. For example, the capabilities of the disclosure can be performed fully and/or partially by one or more of the OLTs, ONTs, MUXs, Demultiplexers, and the like. Also, these capabilities may be performed in the current manner or in a distributed manner and on, or via, any device able to provide, send and/or receive upstream and downstream wavelengths and/or other data. Further, although depicted in a particular manner, various modules or blocks may be repositioned without departing from the scope of the current disclosure. Still further, although depicted and/or described in a particular manner, a greater or lesser number of OLTs, ONTs, MUXs, Demultiplexers, and the like, can be utilized with the present disclosure in order to accomplish the present disclosure, to provide additional known features to the present disclosure, and/or to make the present disclosure more efficient. Also, communication between such modules or blocks can occur via a wired or a wireless connection.

What is claimed is:

1. A passive optical network (PON), comprising:
   an Optical Line Termination (OLT);
   an Optical Distribution Network (ODN); and
   a plurality of Optical Network Terminations (ONTs);
   wherein the OLT includes an OLT Dense Wavelength Division Multiplexing (DWDM) multiplexer, an OLT CWDM demultiplexer, and a Wavelength Division Multiplexing (WDM) filter, wherein the OLT DWDM multiplexer and the OLT CWDM demultiplexer are coupled to the WDM filter;
   wherein the ODN includes a WDM filter, a DWDM demultiplexer, and a plurality of fanout splitters, wherein the DWDM demultiplexer is coupled to the WDM filter;
   wherein the WDM filters are coupled to one another; and
   wherein a portion of the plurality of ONTs that are associated with a wavelength are coupled to one of fanout splitters that is associated with the wavelength.

2. The PON of claim 1, wherein the WDM filter receives a downstream wavelength band comprising a plurality of optical channels.

3. The PON of claim 2, wherein the downstream wavelength band is 1480 nm-1500 nm.

4. The PON of claim 2, wherein the WDM filter routes the plurality of optical channels to the DWDM demultiplexer.

5. The PON of claim 4, wherein the DWDM demultiplexer routes one of the plurality of optical channels of the wavelength to one of the plurality of fanout splitters of the wavelength.

6. The PON of claim 5, wherein the one of the plurality of fanout splitters routes the one of the plurality of optical channels to the portion of the plurality of ONTs.

7. The PON of claim 1, wherein the portion of the plurality of ONTs routes an upstream wavelength band comprising a plurality of optical channels to one of the plurality of fanout splitters.

8. The PON of claim 7, wherein the upstream wavelength band is 1260 nm-1360 nm.

9. The PON of claim 7, wherein the one of the plurality of fanout splitters routes the one of the plurality of optical channels of the upstream wavelength to an optional CWDM multiplexer.

10. The PON of claim 9, wherein the CWDM multiplexer routes the plurality of optical channels of the upstream wavelength to the WDM filter.

11. The PON of claim 10, wherein the WDM filter receives the upstream wavelength comprising a plurality of optical channels from the CWDM filter.

12. The PON of claim 11, wherein the WDM filter routes the plurality of optical channels to the OLT CWDM demultiplexer.

13. The PON of claim 12, wherein the OLT demultiplexer routes each of the plurality of optical channels to a CWDM demultiplexer and associated optical receiver at the OLT.

14. A gigabit passive optical network (GPON), comprising:
- an upstream and downstream combiner;
- a DWDM filter coupled to the upstream and downstream combiner;
- a plurality of splitters;
- a plurality of optical network terminations (ONTs); and
- an Optical Line Termination (OLT);
- wherein the OLT includes an OLT Dense Wavelength Division Multiplexing (DWDM) multiplexer, an OLT CWDM demultiplexer, and a Wavelength Division Multiplexing (WDM) filter, wherein the OLT DWDM multiplexer and the OLT CWDM demultiplexer are coupled to the WDM filter;
- wherein a portion of the plurality of ONTs associated with a wavelength are coupled to one of the plurality of splitters associated with the wavelength.

15. The GPON of claim 14, wherein the upstream and downstream combiner routes a wavelength band comprising a plurality of optical channels to the DWDM filter.

16. The GPON of claim 15, wherein the DWDM filter routes one of the plurality of optical channels to one of the plurality of splitters.

17. The GPON of claim 16, wherein the one of the plurality of splitters routes the one of the plurality of optical channels to the portion of the plurality of ONTs.

18. The GPON of claim 15, further comprising an upstream combiner coupled to the plurality of splitters and the upstream and downstream combiner, the upstream combiner having an input port for each of the plurality of optical channels.

19. The GPON of claim 18, wherein the upstream combiner combines a plurality of time division multiple access optical channels from the plurality of ONTs.

* * * * *